United States Patent [19]

Oppenheim et al.

[11] Patent Number: 5,271,365
[45] Date of Patent: Dec. 21, 1993

[54] JET PLUME INJECTION AND COMBUSTION SYSTEM FOR INTERNAL COMBUSTION ENGINES

[75] Inventors: Antoni K. Oppenheim, Kensington; James A. Maxson, Berkeley; David M. Hensinger, Albany, all of Calif.

[73] Assignee: The United States of America as represented by the United States Department of Energy, Washington, D.C.

[21] Appl. No.: 909,890

[22] Filed: Jul. 7, 1992

[51] Int. Cl.⁵ .................... F02B 19/10; F02B 19/12
[52] U.S. Cl. ................................. 123/256; 123/267; 123/274
[58] Field of Search ............... 123/274, 275, 256, 267, 123/293, 297, 299

[56] References Cited

U.S. PATENT DOCUMENTS

| | | | |
|---|---|---|---|
| 1,502,926 | 7/1924 | Suter | 123/293 |
| 1,684,074 | 9/1928 | Schaeren | 123/275 |
| 2,156,665 | 5/1939 | Mallory | 123/274 |
| 4,006,725 | 2/1977 | Baczek et al. | 123/32 |
| 4,072,134 | 2/1978 | Noguchi et al. | 123/75 B |
| 4,075,996 | 2/1978 | Hisserich | 123/275 |
| 4,096,832 | 6/1978 | Casull et al. | 123/32 SP |
| 4,542,724 | 9/1985 | Blais | 123/266 |
| 4,646,695 | 3/1987 | Blackburn | 123/256 |
| 4,736,718 | 4/1988 | Linder | 123/267 |
| 4,798,190 | 1/1989 | Vaznaian et al. | 123/531 |
| 4,892,070 | 1/1990 | Kuhnert | 123/274 |
| 4,924,828 | 5/1990 | Oppenheim | 123/299 |
| 4,926,818 | 5/1990 | Oppenheim et al. | 123/297 |
| 4,974,571 | 12/1990 | Oppenheim et al. | 123/531 |
| 4,979,479 | 12/1990 | Furakawa | 123/472 |
| 5,085,189 | 2/1992 | Huang et al. | 123/275 |

FOREIGN PATENT DOCUMENTS 55-117024 9/1980 Japan ..................... 123/256

OTHER PUBLICATIONS

Oppenheim et al., "Combustion by Pulsed Jet Plumes-Key to Controlled Combustion Engines," Society of Automotive Engineers, Inc., #890153, 1989 (Feb. 27--Mar. 3).
Maxsan et al., "Pulsed Jet Combustion-Key to a Refinement of the Stratified Charge Concept," Twenty-Third Symposium on Combustion/The Combustion Society, 1990, pp. 1041-1046.
Maxson et al., "Performance of Multiple Stream Pulsed Jet Combustion Systems," Society of Automotive Engineers, Inc., #910565, 1991, (Feb 25-Mar. 1).
Hensinger et al., "Jet Plume Injection and Combustion" SAE Technical Paper Series 920414 Feb. 24-28, 1992.

Primary Examiner—Andrew M. Dolinar
Attorney, Agent, or Firm—Miguel A. Valdes; Roger S. Gaither; William R. Moser

[57] ABSTRACT

An improved combustion system for an internal combustion engine is disclosed wherein a rich air/fuel mixture is furnished at high pressure to one or more jet plume generator cavities adjacent to a cylinder and then injected through one or more orifices from the cavities into the head space of the cylinder to form one or more turbulent jet plumes in the head space of the cylinder prior to ignition of the rich air/fuel mixture in the cavity of the jet plume generator. The portion of the rich air/fuel mixture remaining in the cavity of the generator is then ignited to provide a secondary jet, comprising incomplete combustion products which are injected into the cylinder to initiate combustion in the already formed turbulent jet plume. Formation of the turbulent jet plume in the head space of the cylinder prior to ignition has been found to yield a higher maximum combustion pressure in the cylinder, as well as shortening the time period to attain such a maximum pressure.

20 Claims, 8 Drawing Sheets

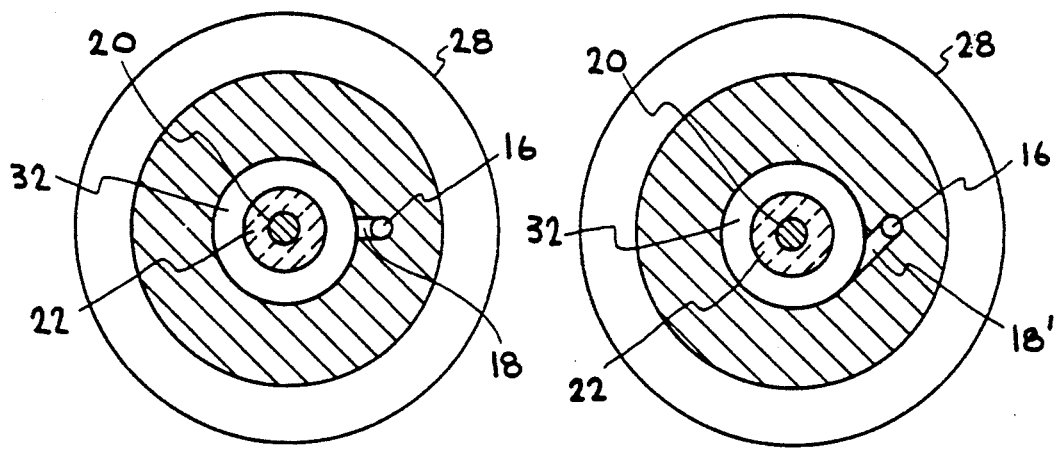
FIG. 2A  FIG. 2B
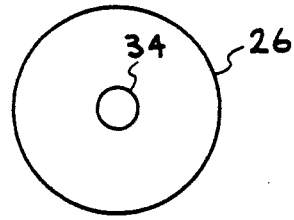  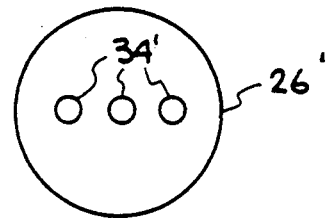
FIG. 3  FIG. 4
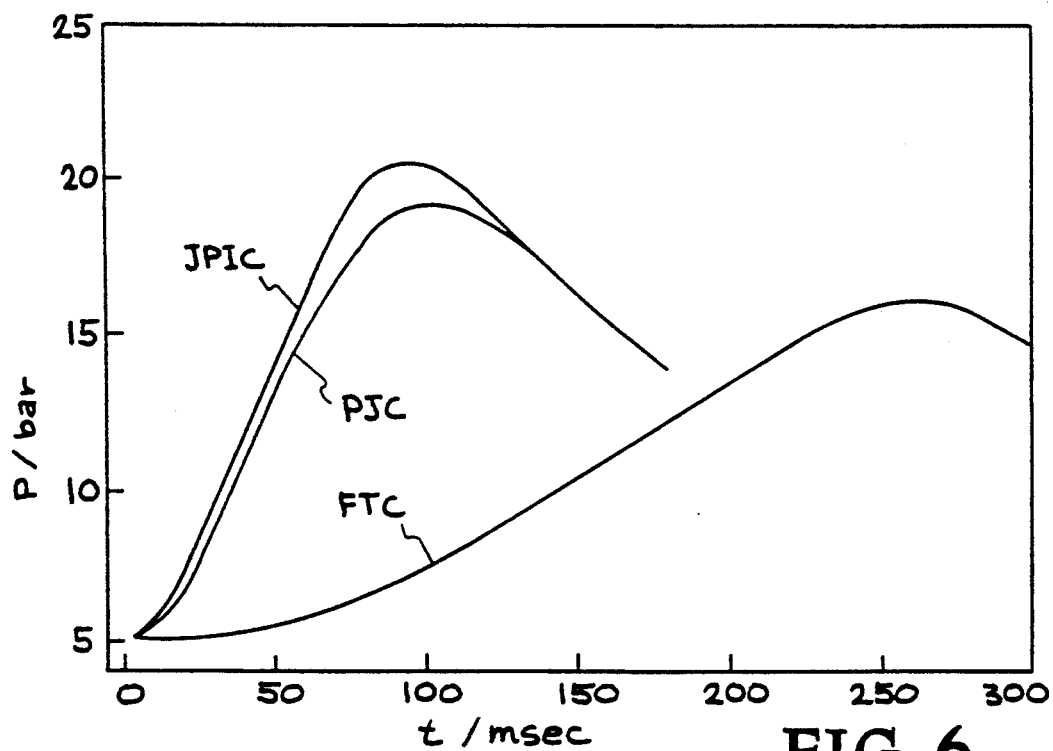
FIG. 6

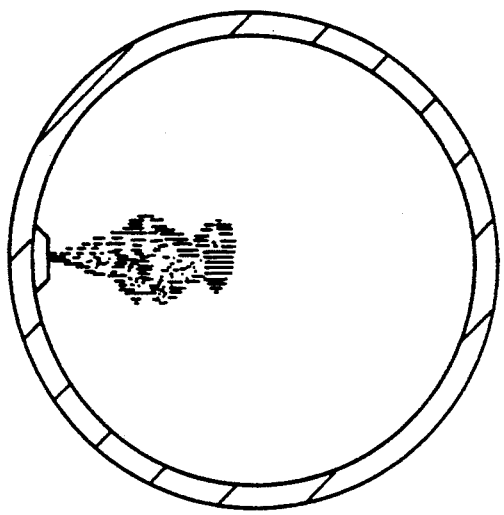
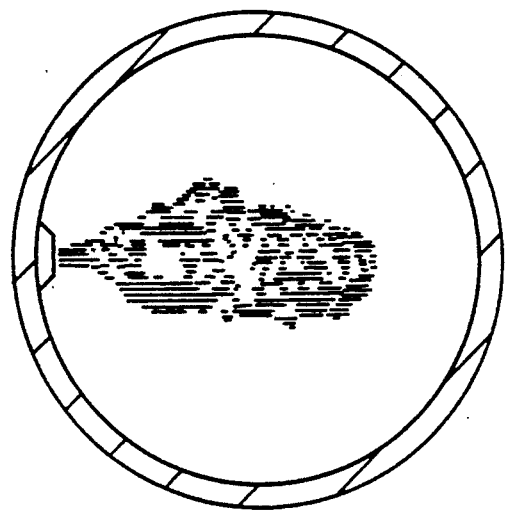
FIG. 7A                FIG. 7B
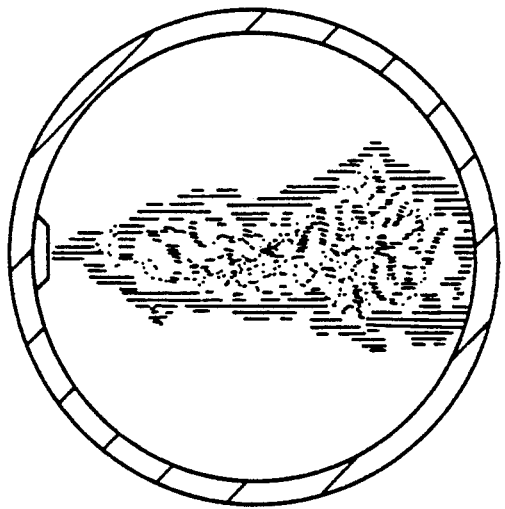
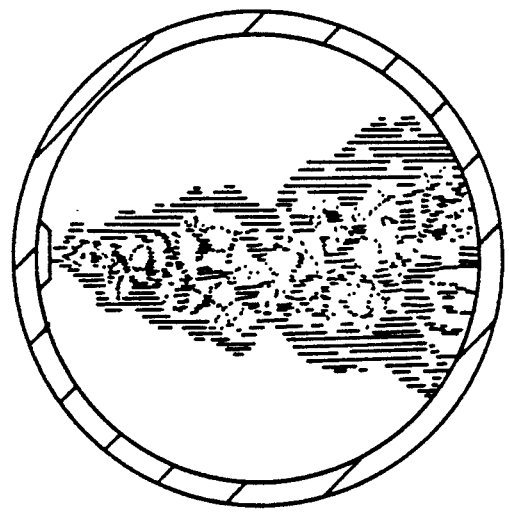
FIG. 7C                FIG. 7D

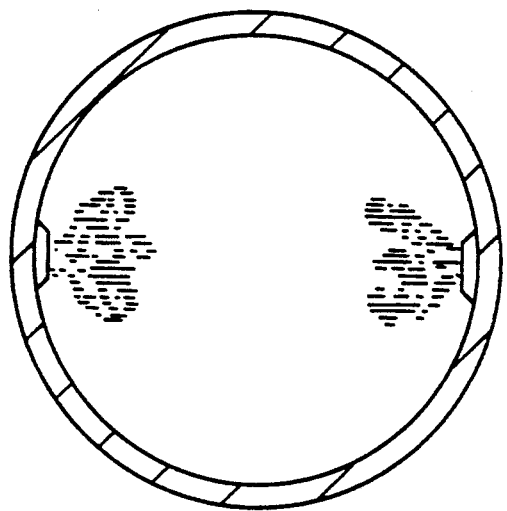
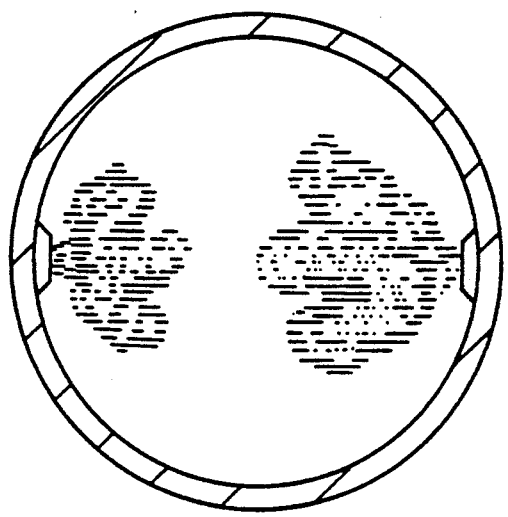
FIG. 10A  FIG. 10B
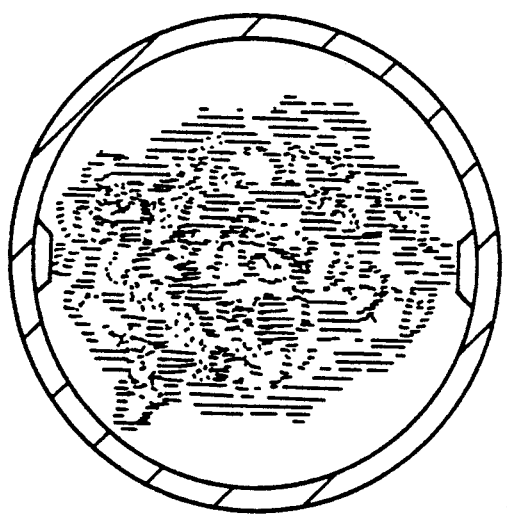
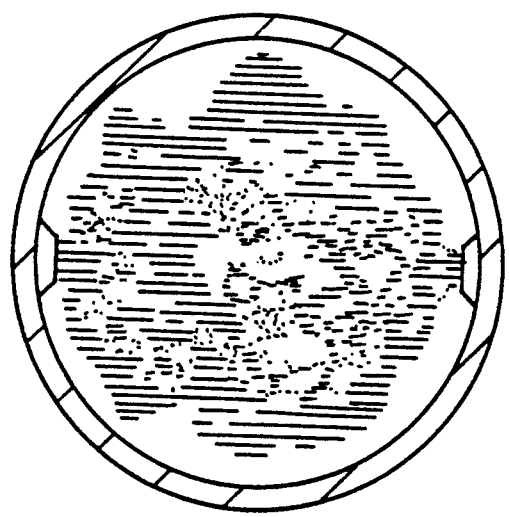
FIG. 10C  FIG. 10D

JET PLUME INJECTION AND COMBUSTION SYSTEM FOR INTERNAL COMBUSTION ENGINES

BACKGROUND OF THE INVENTION

The invention described herein arose in the course of, or under, Contract No. DE-AC03-76SF00098 between the United States Department of Energy and the University of California.

This invention relates to a new method and apparatus for executing combustion in an internal combustion engine. More particularly, this invention relates to a new method and apparatus for executing combustion in an internal combustion engine wherein a rich air/fuel mixture is injected into the head space of a cylinder under pressure from a jet generator to produce a turbulent plume which entrains the surrounding lean mixture into its vortex cores, and thereafter a portion of the rich air/fuel mixture remaining in the cavity of the jet generator is ignited therein to thereby subsequently inject products of incomplete combustion into the vortex cores of the previously injected turbulent plume, to initiate therein the exothermic combustion process.

Conventionally the process of combustion in an internal combustion engine is executed by a Flame Traversing the Charge (FTC). The deficiencies of this type of combustion are well known and have led to much research that led to the development of Direct Injection Stratified Charge (DISC) engines. There are two alternative modes of combustion in stratified charge engines: the torch mechanism of flame propagation; and combustion in a turbulent jet plume.

The torch mechanism, typical of practically all the divided chamber stratified charges engines such as the CVCC (of Honda), is characterized by continuous propagation of a turbulent flame upon its ignition in the prechamber. The prechamber is, for this purpose, relatively large, and it is connected to the cylinder head space by a relatively wide passageway. Combustion, once started, propagates without interruption as a turbulent flame. Typical torch mechanism type stratified charge devices are shown, for example, in Noguchi et al. U.S. Pat. No. 4,072,134; Casull et al. U.S. Pat. No. 4,096,832; and Kuhnert U.S. Pat. No. 4,892,070.

Flame propagation via the torch mechanism is, in effect, an enhanced version of the conventional Flame Traversing the Charge (FTC) mode of combustion, whereas in the turbulent jet plume mode of combustion, referred to as Pulsed Jet Combustion or PJC, ignition of a rich mixture in the cavity of the PJC generator causes the products of its incomplete combustion, generated in the cavity when triggered by this ignition, to be ejected into the head space of the cylinder in the form of a jet. This jet forms a plume in the head space of the cylinder, comprising a turbulent field consisting of large scale vortex structures whose circulation provides the motive force for entrainment and spiral mixing between the medium injected from the cavity of the PJ generator and the compressed lean air/fuel mixture already in the cylinder head space. The flame propagation taking place in the PJC cavity is arrested by shear at efflux of the products of combustion emanating from the small orifice or orifices separating the PJC cavity from the cylinder head space, so that, upon such cessation of the process of combustion, it is re-established at the cores of the vortex structures, thereby providing the superior combustion mechanism that characterizes the turbulent jet plume or PJC type of stratified charge combustion over the conventional FTC type of internal combustion engines, irrespective of whether combustion is initiated by a spark discharge, or by a torch, as in a conventional stratified charge engine.

The turbulent jet plume or PJC type of combustion system is more fully described in my previous patent, Oppenheim U.S. Pat. No. 4,924,828, entitled Method and System for Controlled Combustion Engines, as well as in Oppenheim et al. U.S. Pat. No. 4,926,818, entitled Pulsed Jet Combustion Generator for Premixed Charge Engines, which describes in more detail the device used for generating the pulsed jets which will form the desired plumes comprising vortex structures to entrain and ignite the compressed fluid or fluids already in the head space of the cylinder.

While such a turbulent jet plume or PJC combustion system has been demonstrated to be superior to either the conventional flame traversing the charge (FTC) combustion system or even the torch jet type of stratified charge combustion system, further refinements of the turbulent jet plume type of combustion have been discovered which further enhance the performance of this type of combustion system.

SUMMARY OF THE INVENTION

In particular, it has been discovered that instead of feeding a rich air/fuel mixture into the cavity of the PJC generator and then igniting the mixture, to both initiate combustion and cause injection of the incomplete combustion products in the PJC generator into the head space of the cylinder as a jet plume; in accordance with the invention, the rich air/fuel mixture is injected at high pressure into the PJC generator and then into the head space of the cylinder through one or more orifices in the tip or cap of the PJC generator to form the turbulent jet plume in the head space of the cylinder prior to ignition of the rich air/fuel mixture in the cavity of the PJC generator. The portion of the rich mixture remaining in the cavity of the PJC generator is then ignited to provide a secondary jet, comprising incomplete combustion products which are injected into the cylinder to initiate combustion in the already formed turbulent jet plume.

Formation of the turbulent jet plume in the head space of the cylinder prior to ignition has been found to result in a higher combustion pressure in the cylinder, as well as a shorter time period to attain such a maximum pressure.

BRIEF DESCRIPTION OF THE DRAWINGS

FIG. 2A is a section view of a portion of the assembly of FIG. 1 taken along lines 2—2.

FIG. 2B is a section view of an alternate embodiment to the structure shown in FIG. 2A.

FIG. 3 is an end view of the tip of a pulsed jet combustion generator assembly such as that depicted in FIG. 1 with a single orifice tip embodiment.

FIG. 4 is an end view of the tip of a pulsed jet combustion generator assembly such as that depicted in FIG. 1 showing a three orifice tip embodiment.

FIG. 6 is a graph showing comparative pressure pulses (plots of pressure versus time) of prior art (FTC and PJC) combustion systems versus the combustion system (JPIC) of the invention.

FIGS. 7A-7D are illustrations of test results showing jet plumes produced by a single orifice JPIC system of the invention.

FIGS. 10A-10D are illustrations of test results showing jet plumes produced by a dual triple orifice JPIC system of the invention.

DETAILED DESCRIPTION OF THE INVENTION

The combustion system of the invention comprises an improvement over previously described PJC systems wherein, in accordance with the invention, a rich air/fuel mixture is injected at high pressure through the PJC generator into the head space of the cylinder to form one or more jet plumes consisting of vortex structures which entrain the compressed lean fuel mixture already in the cylinder. Ignition and combustion is initiated in the PJC generator following the high pressure injection, i.e., when the high pressure fuel injector is shutting off. The system of the invention is, therefore, referred to herein as a Jet Plume Injection and Combustion (JPIC) system because of the sequential injection and combustion steps involved in the invention.

Figure 1:
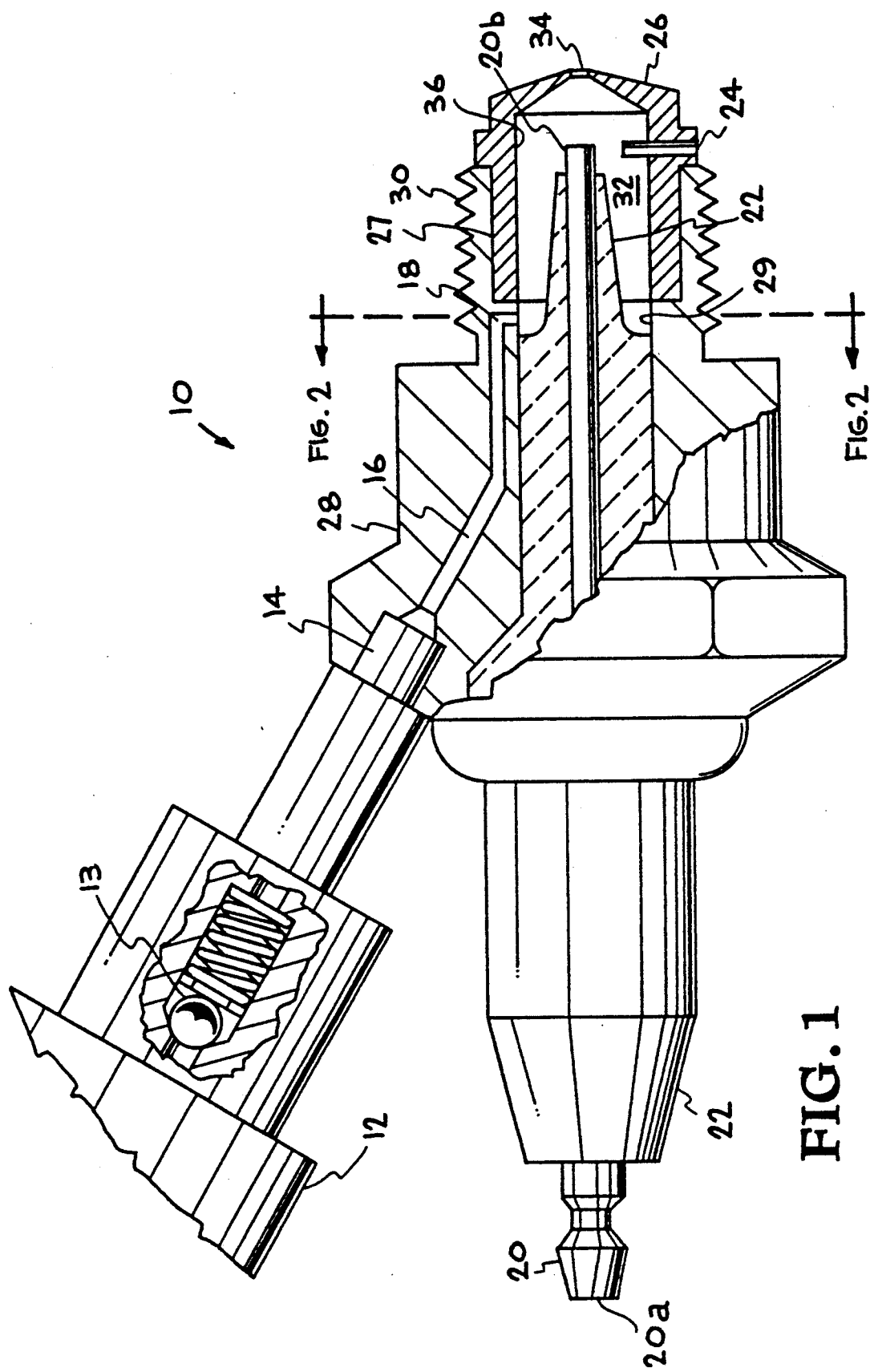
FIG. 1 is a partially cutaway side view of one embodiment of a modified pulse jet combustion generator assembly suitable for use in the practice of the invention.

The combustion system of the invention, therefore, utilizes a modified form of the pulse jet combustion (PJC) generator described and claimed in Oppenheim et al. U.S. Pat. No. 4,926,818, cross-reference to which is hereby made. FIG. 1 shows one embodiment of such a pulse jet combustion generator modified to function as a part of the system of the invention. The modified PJC generator generally shown at 10 in FIG. 1 comprises a metal body 28 provided with external threads 30 which permit generator 10 to be threadedly fitted into a conventionally threaded spark plug bore of an internal combustion engine. A ceramic insulator 22 is mounted partially within a first bore 29 in metal body 28, with a high voltage electrode 20 centrally passing through insulator 22 and terminating (at one end) at a tip 20a for external connection to a firing mechanism (not shown), and terminating, at its opposite end 20b, in cavity 32 of generator 10.

Metal body 28 is further provided with a counter bore 27 into which an orifice tip or cap 26 is fitted, either by a press fit or via threads. Orifice tip 26 may be provided with a single central orifice 34, as shown in FIG. 3, through which the jet plume of the rich air/fuel mixture will be introduced into the head space of the cylinder, as will be described below.

In a preferred embodiment, orifice tip 26 may be provided with three spaced apart in-line orifices 34', as shown in FIG. 4, to provide a fan-like triple jet plume, as will be discussed below. When such a multiple orifice structure is used, the line of the orifices should be parallel to a cross-section plane of the cylinder so that the fan-like triple jet plume will spread in a plane normal to the axis of the cylinder.

Figure 5:
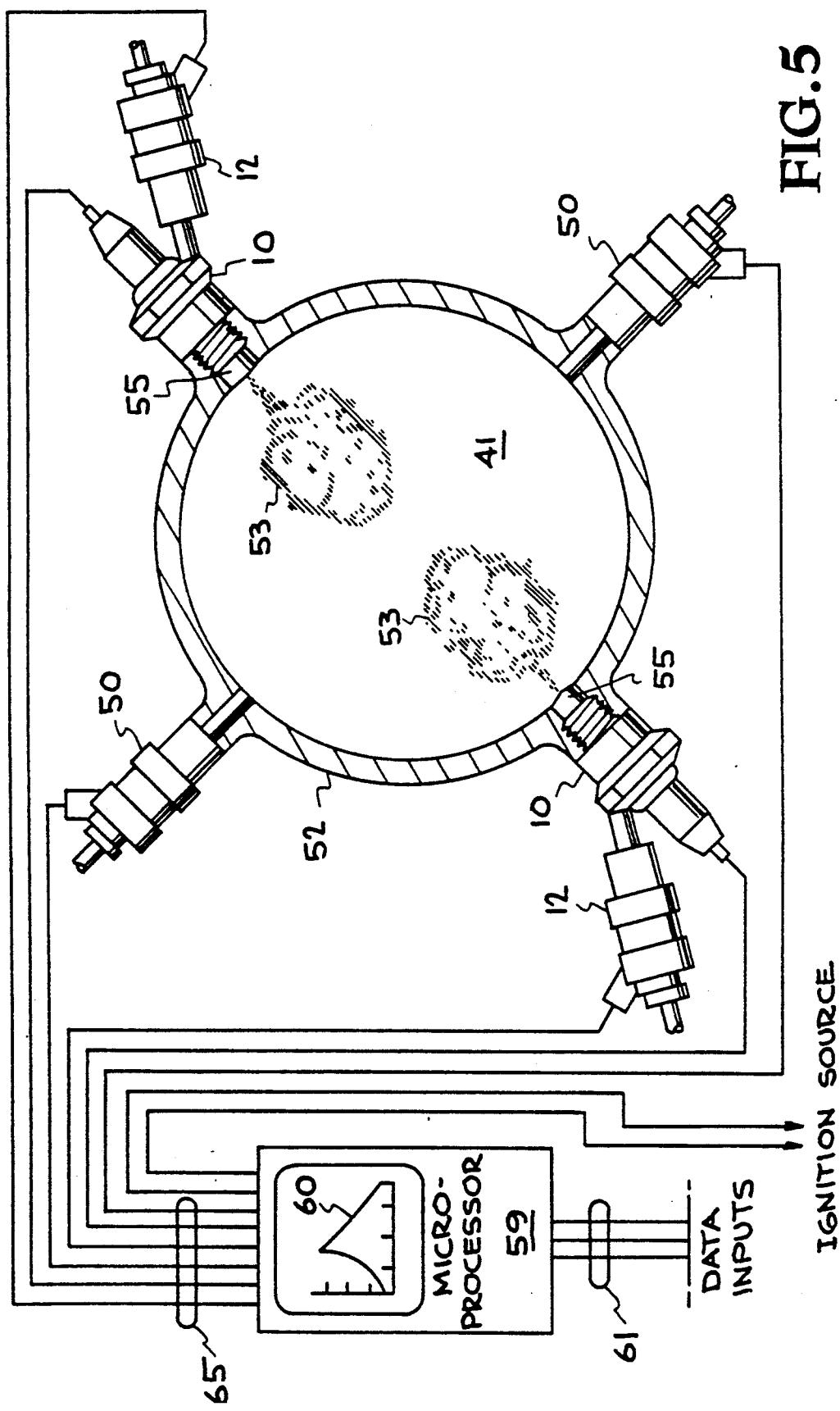
FIG. 5 is a plan view illustrating the combustion, system of the invention including a horizontal cross-section view of an engine cylinder together with a schematic representation of a dual direct injection system for early injection of fuel in order to form a lean air/fuel mixture in the cylinder and a dual JPIC generator system to produce turbulent jet plumes and initiate therein the exothermic processes of combustion by secondary jets of products arising from combustion of the charge in the generator cavity.
Figure 8A:
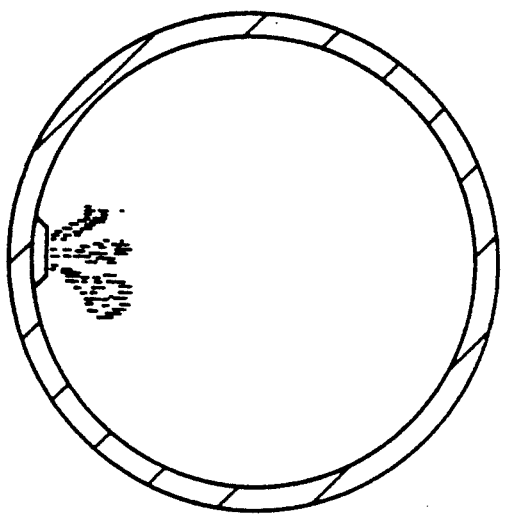
FIGS. 8A-8D are illustrations of test results showing jet plumes produced by a triple orifice JPIC system of the invention.
Figure 8B:
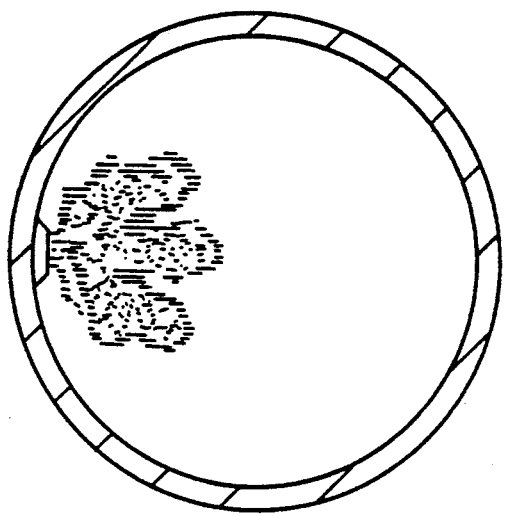
Figure 8C:
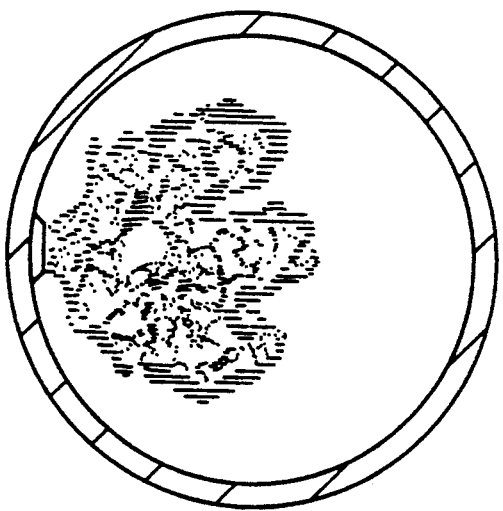
Figure 8D:
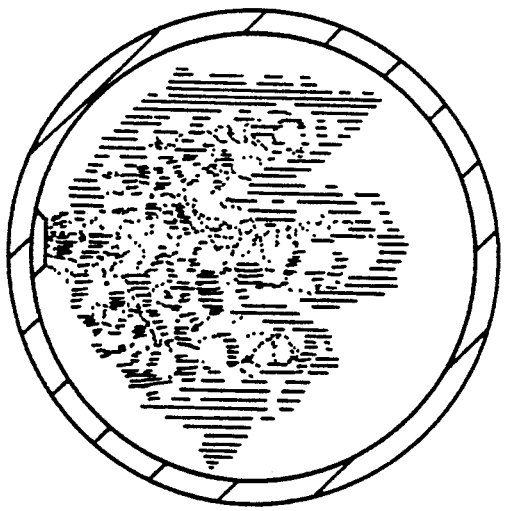
Figure 9A:
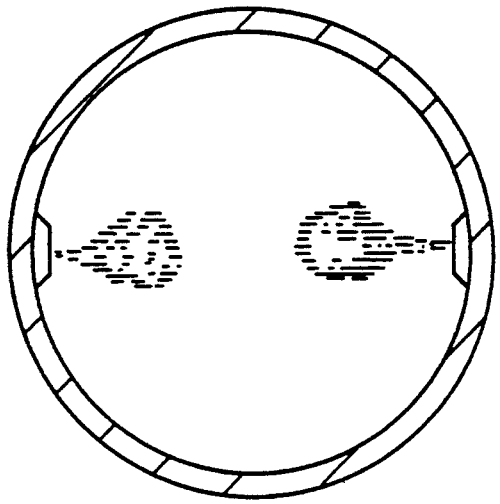
FIGS. 9A-9D are illustrations of test results showing jet plumes produced by a dual single orifice JPIC system of the invention.
Figure 9B:
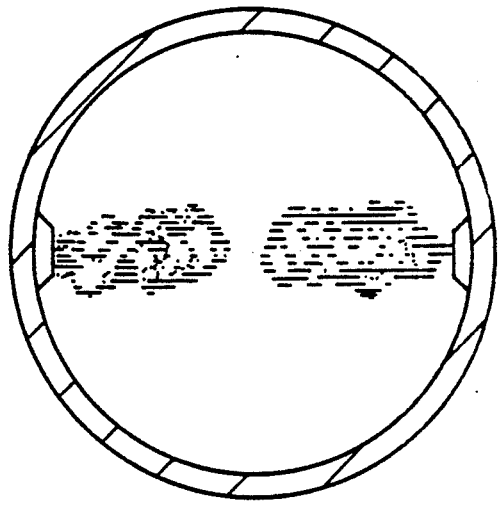
Figure 9C:
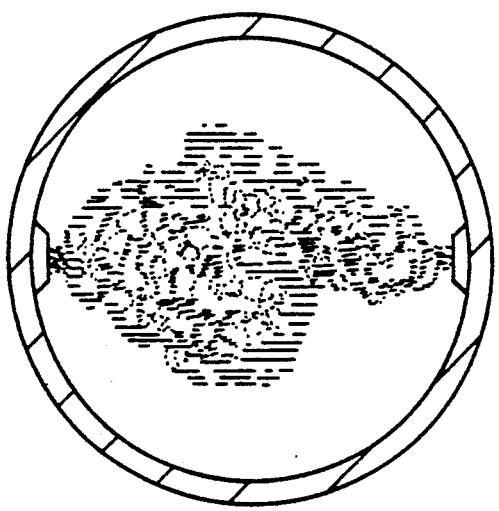
Figure 9D:
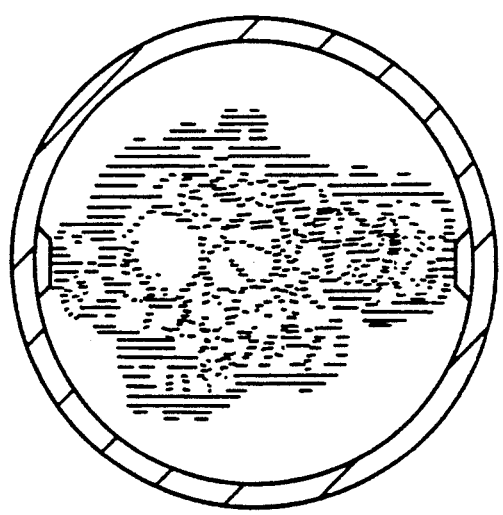

Still referring to FIG. 1, orifice tip 26 has a central bore 36 which, in the illustrated embodiment, may be the same diameter as bore 29 in metal body 28. Bore 36 defines cavity 32 through which the rich air/fuel mixture passes before being injected through orifice 34 or orifices 34' into head space 41 of cylinder 52, as shown in FIG. 5.

A ground electrode 24 is provided in the sidewall of orifice tip 26 terminating adjacent end 20b of high voltage electrode 20 within cavity 32 to define a spark gap therebetween used to ignite the portion of the rich air/fuel mix remaining in cavity 32 after the initial injection of the plume into head space 41 of cylinder 52 to ignite the fuel, as will be described below.

The rich air/fuel mixture to be injected into head space 41 in cylinder 52 is initially injected into cavity 32 in generator 10 via fuel injector 12 from an external source (not shown). The rich air/fuel mixture passes from fuel injector 12 through a check valve mechanism 13, which prevents any backflow of fuel or combustion products into fuel injector 12, and then through a bore 14 in plug body 28 to a longitudinal fuel passage 16 in body 28 to a radial fuel passage 18 and then into cavity 32. Bore 14, as shown in FIG. 1, is smooth to permit injector 12 and check valve 13 to be press fitted into plug body 28. Alternatively bore 14 could be threaded to permit injector 12 and check valve 13 to be threadedly fitted into bore 14, or a sleeve could be fitted into bore 14 to permit injector 12 and check valve 13 to be secured to such a sleeve, for example, by being clamped thereto.

Referring to FIGS. 2A and 2B, radial fuel passageway 18, leading from longitudinal fuel passage 16 to cavity 32, may be perpendicular to the curved edge of cavity 32, as shown in FIG. 2A, or radial passageway 18 may be angled to be situated more tangentially to the curved edge of cavity 32, as shown at 18' in FIG. 2B, to form a swirl of the rich air/fuel mixture in cavity 32.

With reference to the embodiment of the modified PJC generator shown in FIGS. 1, 2A, and 2B, it should be noted that an in-line PJC generator, such as the PJC generator disclosed and claimed in Oppenheim et al. U.S. Pat. No. 4,926,818, may also be used in the practice of the invention, provided that it is suitable modified to provide the high pressure injection of the rich air/fuel mixture (prior to ignition) which characterizes the present invention.

In the practice of the invention, electronic fuel injector 12 is activated for a time period which may range from as short as about 2 millisecond (msec), which is about the limit of minimum response time in commercially available electronic fuel injectors, up to about 20 milliseconds, to provide a high pressure flow of a rich air/fuel mixture into cavity 32. This rich air/fuel mixture then flows from cavity 32 into the head space of the cylinder via the one o more orifices 34 in orifice tip 26 to form the desired jet plume and vortex structures therein in the cylinder, thereby entraining in the vortices of the jet plume the compressed lean fuel/air mixture already present in the cylinder.

Fuel injector 12 is then inactivated and a spark is struck between end 20b of high voltage electrode 20 and ground electrode 24 to initiate combustion by igniting those portions of the rich air/fuel mixture which remain in cavity 32 from the injection of rich air/fuel mixture which has just taken place. The incomplete combustion products generated in cavity 32 triggered by such ignition then exit into the cylinder via the one or more orifices 34 to form a second jet within the initial jet plume, the second jet containing partially combusted gases which then ignite the gases in the initial jet plume, including the entrained compressed lean air/fuel mixture.

Thus, the system of the invention involves two steps, the first step of injection of the rich air/fuel mixture into the head space of the cylinder to form the jet plume entraining the surrounding compressed lean mixture of air/fuel already in the cylinder into its vortex cores; and then the second step of initiating combustion of the gases in the cylinder by igniting the rich gas mixture remaining in cavity 32, causing injection of the products of incomplete combustion of this rich mixture from cavity 32 into the cylinder to initiate the exothermic process of combustion in the vortex cores of the jet plume, giving rise to the designation of the combustion system as a Jet Plume Injection and Combustion (JPIC) system.

The injection of the rich air/fuel mixture into the cylinder from the PJC generator begins at an appropriate time before the piston in the cylinder reaches top dead center (TDC) as needed for optimum tuning of the particular engine. Ignition in the generator cavity commences when the fuel injection is shutting off, i.e., within about 2–20 milliseconds after initiation of the rich air/fuel mixture into the cylinder.

Since the rich air/fuel mixture is, therefore, injected into the head space of the cylinder to mix with the already compressed lean air/fuel mixture, the rich air/fuel mixture must be injected into the head space of the cylinder under a pressure which exceeds the pressure of the already compressed lean air/fuel mixture in the cylinder, which is usually of an order of about 100 bars. In the prior art PJC combustion system, such pressure is obtained solely by ignition of the rich air/fuel mixture in the cavity of the PJC generator to cause its injection into the cylinder, thus permitting the rich air/fuel mixture to be fed into the PJC cavity at a low pressure.

However, since the rich air/fuel mixture is to be injected into the cylinder before ignition is commenced in the PJC generator cavity, in the JPIC system of the invention, the pressure needed for injection must come from the pressurized source of rich air/fuel mixture and fuel injector 12 must be capable of reliably handling the rich air/fuel mixture, as an essentially gaseous medium, at such high pressure.

Furthermore, the fuel injector must be capable of handling the rich air/fuel mixture, in a high pressure gaseous state, without leaking and without sticking. Commercially available fuel injectors, such as, for example, Lucas fuel injector No. A1161AAA, have been successfully used with 10 bars pressure upstream (representing the pressurized source of rich air/fuel mixture) and 5 bars pressure downstream (representing the pressure of the fluid or fluids already compressed in the cylinder), providing a flow rate of 332 grams/second.

The pressurized source of rich air/fuel mixture in the gaseous state may be obtained using a compressed light hydrocarbon gas such as methane (including natural gas), or ethane, or propane, which are gases at high pressure at room temperature, or by the use of other organic fuels such as methanol or heavier hydrocarbons which are vaporized as needed and mixed with air to provide the rich air/fuel source as a pressurized gaseous medium fed to fuel injector 12 for injection into the head space of the cylinder prior to ignition. If needed, the pressure may be obtained or supplemented by the use of a suitable compressor which, in view of the relatively small amount of air-fuel mixture required, should not demand much energy expenditure.

The term "rich air/fuel mixture" is defined herein as an air/fuel mixture containing an excess of fuel over the stoichiometric ratio, wherein the amount of oxygen provided in the air is theoretically just sufficient to produce fully saturated oxides, that is, in the case of hydrocarbon fuels, carbon dioxide and water molecules. The term "rich air/fuel mixture" may be further defined as when the so-called equivalence ratio $\Phi$, i.e., the stoichiometric air to fuel ratio $(A/F)_{stoichiometric}$ divided by the actual air to fuel ratio, $(A/F)_{actual}$, exceeds unity. A "lean air/fuel mixture", then means a mixture wherein the air in the mixture exceeds a stoichiometric ratio or where the equivalence ratio $\Phi$, is less than unity.

An essentially equivalent "lean mixture" can be obtained by the use of a diluent gas in place of some part of excess air. The preferable medium to be used for that purpose is the residual gas, its amount by weight being about the same as the excess air. Such technique is referred to as RGR, residual gas recirculation.

In the system of the invention, the equivalence ratio $\Phi$ of the rich air/fuel mixture injected into the cylinder may preferably be about 2, which will permit the internal combustion engine to operate with a very lean mixture, whereby the products of incomplete combustion issuing from the PJC generator may burn in a lean mixture containing significantly less fuel than that required for idling.

Turning now to FIG. 5, the jet plume injection and combustion system of the invention is shown installed in a cylinder 52. In the illustrated embodiment of FIG. 5 two modified PJC generators 10 have been mounted in openings 55 on opposite sides of cylinder 52, whereas the primary fuel is introduced into the cylinder at the start of compression, when the pressure in the cylinder is low, by suitable injectors 50, which can be conventional or preferably air-assisted, shown on opposite sides of cylinder 52.

Other arrangements, such as the use of four modified PJC generators 10, may be employed as well. Such a four generator arrangement is shown in Oppenheim U.S. Pat. No. 4,924,828, entitled Method and System For Controlled Combustion Engines, cross-reference to which is hereby made.

Thus, at the time of the rich air/fuel injection from the PJC generator, the head space 41 in cylinder 52 will already contain a compressed fluid comprising a lean mixture of air and fuel previously admitted through one or more fuel injectors 50.

The operation of the engine, including activation of fuel injectors 50, fuel injectors 12, and ignition in generators 10 after injection of the rich air/fuel mixture into head space 41 to form jet plumes 53, preferably is controlled, as shown at FIG. 5, by a microprocessor 59. As shown, engine condition data inputs, such as crankangle CA and cylinder pressure and other sensors of operating conditions in the cylinder, may be fed to microprocessor 59 at 61. Output signals 65 control fuel injectors 50, as well as fuel injectors 12, and the ignition of the rich air/fuel mixture in generators 10, after injection of the rich air/fuel mixture into cylinder 52.

Turning now to FIG. 6, the maximum developed pressures in the cylinder after ignition, with respect to time, are plotted for the conventional prior art FTC combustion system; the prior art PJC combustion system described and claimed in U.S. Pat. Nos. 4,924,828 and 4,926,818; and the jet plume injection and combustion (JPIC) system of the invention. It will be seen that the JPIC system of the invention develops a higher maximum pressure than either of the other two systems, in fact considerably higher than the FTC system. It will also be noted that the time to reach the peak pressure is shorter for the JPIC system of the invention than for the prior art systems.

FIGS. 7-10 are illustrations of test results showing the jet plumes after ignition in the cylinder respectively for a single generator with a single orifice (FIG. 7); a single generator with a triple orifice (FIG. 8); two opposed generators, each with a single orifice (FIG. 9); and two opposed generators, each with triple orifices (FIG. 10). In each instance, the rich air/fuel mixture was injected for 2 milliseconds, after which the trigger for shutting the solenoid-controlled high pressure fuel injector(s) was activated, and the electric discharge for igniting the remaining rich air/fuel mixture in the generator was also triggered.

In each of FIGS. 7-10, the jet plumes are respectively shown at A at 2.5 msec. after ignition, at B at 5 msec. after ignition, at C at 10 msec. after ignition, and at D at 15 msec. after ignition. The orifice diameter for the single orifice configurations of FIGS. 7 and 9 were 2.5 mm, while the orifice diameters for the triple orifice configurations of FIGS. 8 and 10 were each 1.44 mm, so that the total orifice area remained the same.

The high pressure fuel injector used for the tests was a Lucas No. A1161AA injector with a flow rate of 332 gm/sec when upstream pressure is 10 bars and downstream pressure is 5 bars. The injector was triggered by a microprocessor signal of 0.1 millisecond time response, whereas switching it from fully open to fully closed took approximately 1.5 msec. The power source for spark ignition consisted of an automotive 12 volt ACCEL coil with 120 mJ in stored energy and a TTL switching circuit triggered by a microprocessor signal. The test vessel was a stainless steel cylinder with a bore of 8.26 cm and a width of 5 cm for a total volume of about 270 cm$^3$. The ends of the cylinder were capped with 5 cm thick optical quartz glass to allow schlieren photography. Ports were provided on the sides for mounting the PJC generators, spark plugs (for standard TDC ignition), charging with premixed gases, and evacuation of the cylinder. During operation, the vessel was wrapped with heating tape to maintain it at a constant temperature of 60° C. This slightly elevated temperature prevented condensation of products and facilitated evacuation of the cylinder, but was low enough to allow handling.

The time resolved pressure profile in the test cylinder was recorded using a Kistler 603B1 acceleration-compensated, piezo-electric transducer of high-impedance charge-signal output, using a Model 504E dual mode amplifier. The natural frequency of the system was over 500 kHz. The signal was digitized and recorded by a Hewlett-Packard 54111D oscilloscope, providing a 2 gigasample per second digitizing rate in a 500 MHz band width. The recorded data were first low pass filtered to remove high frequency noise and then fitted with a 25th order polynomial to evaluate the rate of pressure rise. A conventional Z-configuration, double-mirror schlieren system was used to photograph the combustion field in the cylinder. Employed for this purpose was an EG&G light source consisting of Model PS302 power supply, FY-903 trigger module, and FX-800 xenon flash lamp.

In each instance (but particularly in FIGS. 8D, 9D, and 10D), it can be seen that the ignited jet plume, has entrained in its vortex structures the compressed lean air/fuel mixture already present in the cylinder when the unignited rich air/fuel mixture is first injected into it. It will also be noted that much of the exothermic process takes place in the form of a fireball—a turbulent regime of combustion established in the middle of the cylinder away from the walls. The beneficial effects of diminished contact of combustion products with the walls are of significance in both the rate of the process and its extent, due to the reduction of heat transfer losses, as well as sustenance of the circulation due to the large scale vortex structures of the plume that would otherwise be destroyed by collision with the walls.

Figure 11:
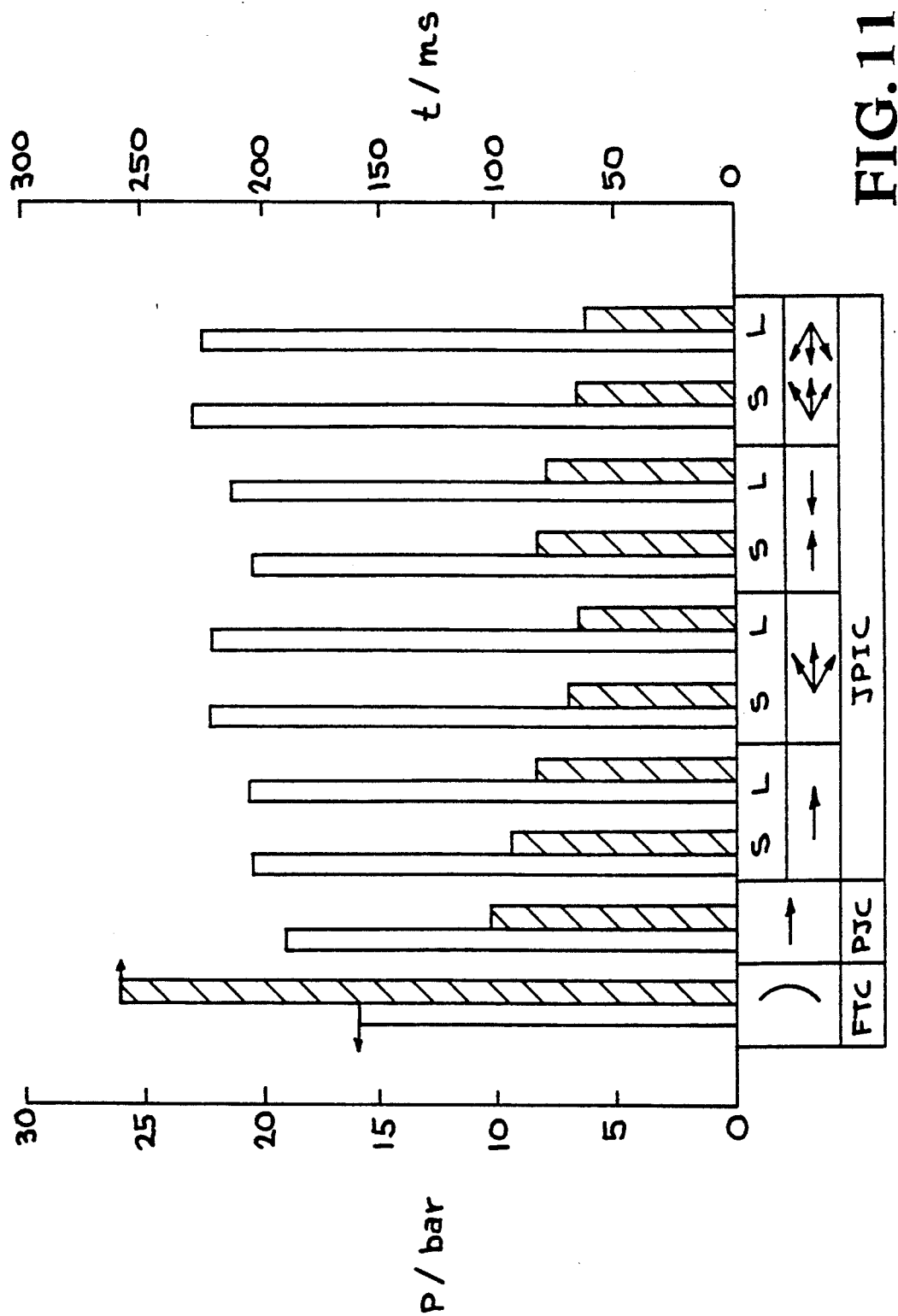
FIG. 11 is a bar graph showing maximum pressures and time to reach such maximum pressures for prior art (FTC and PJC) combustion systems versus the various embodiments of the combustion system (JPIC) of the invention depicted in the FIGS. 7a-7D through 10A-10D.

FIG. 11 is a bar graph which further compares the maximum pressures developed, and the time to develop such maximum pressures, between the prior art FTC combustion system; the PJC combustion system described and claimed in U.S. Pat. No. 4,924,828 and 4,926,818; and the jet plume injection and combustion (JPIC) system of the invention. In this instance two pressure maximums and two time periods are recorded for each of the generator and orifice configurations previously described, respectively, for FIGS. 7-10. These two pressure and time bars respectively represent a short unignited rich air/fuel mixture injection period of 2 milliseconds (as depicted in FIGS. 7-10) and a longer injection period of 20 milliseconds.

It will be seen that the longer injection period results in a higher pressure maximum developed, even though all of the maximum pressures, whether representing short or long injection periods, are higher than the maximum pressures developed in the prior art. It will also be noted that the time to reach maximum pressure is also shorter when the injection period is extended. However, the small extent of the difference in developed high pressure would indicate that within the 2-20 millisecond range of injection time, the process is capable of operating in a satisfactory manner relatively independent of injection time.

Thus, the JPIC combustion system of the invention provides an improved combustion system for an internal combustion engine wherein an unignited rich air/fuel mixture is injected under pressure into the head space of a cylinder to form a jet plume having vortex structures which entrain the lean air/fuel mixture, already in the cylinder, and then the remaining portions of the rich air/fuel mixture are ignited in a cavity of a PJC generator and then injected into the cylinder as a second jet through orifices between the generator cavity and the cylinder to initiate combustion of the jet plume of rich air/fuel mixture already injected into the cylinder combined with the lean fuel mixture entrained into the vortices of the jet plume. The jet plume injection and combustion system of the invention permits an internal combustion engine to be operated in a two cycle or four cycle mode, albeit the two cycle is preferable in view of the intrinsically lean charge.

While specific embodiments of the jet plume injection and combustion system of the invention has been illustrated and described for carrying out the combustion process in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. An improved combustion process for an internal combustion engine which comprises:
   a) providing a lean air/fuel mixture to a cylinder of an internal combustion engine;
   b) injecting an unignited rich air/fuel mixture at a pressure exceeding the pressure in said cylinder into at least one generator cavity adjacent said cylinder so that said rich air/fuel mixture will flow from said cavity into said cylinder through at least one orifice in said at least one generator cavity to form a jet plume of such rich air/fuel mixture in said cylinder which entrains said lean air/fuel mixture therein;
   c) igniting, in said cavity, portions of said rich air/fuel mixture remaining in said cavity after said high pressure injection; and
   d) injecting through said orifice into said cylinder the incomplete combustion products generated in said cavity, triggered by said ignition in said cavity, to initiate combustion in said cylinder of said rich air/fuel mixture previously injected into said cavity and said lean air/fuel mixture entrained in said rich air/fuel mixture.

2. The combustion process of claim 1 which further includes providing electrode means in said cavity to form a spark therebetween to ignite said rich air/fuel mixture remaining in said cavity after said high pressure injection into said cylinder.

3. The process of claim 2 which includes providing a plurality of said orifices from said generator cavity to said cylinder to thereby inject said high pressure jet plume of said rich air/fuel mixture into said cylinder.

4. The process of claim 3 wherein said step of providing said plurality of orifices between said cavity and said cylinder further includes disposing said orifices in a line lying in a plane normal to the axis of said cylinder whereby said jet plume will flow into said cylinder in a plane perpendicular to said axis of said cylinder 5. The process of claim 2 which further includes injecting more than one high pressure jet plume of said rich air/fuel mixture into said cylinder through orifices from a plurality of generators spaced about the periphery of said cylinder.

6. The process of claim 5 wherein said orifices from said generator cavities spaced about said periphery of said cylinder are disposed in a plane perpendicular to the axis of said cylinder.

7. The process of claim 4 which further includes injecting said more than one high pressure jet plumes from generator cavities spaced about the periphery of said cylinder, each of said generator cavities having a plurality of orifices providing communication between said generator cavity and said cylinder, all of said orifices disposed in a plane perpendicular to the axis of said cylinder.

8. An improved combustion process for an internal combustion engine which comprises:
   a) providing a lean air/fuel mixture to a cylinder of an internal combustion engine;
   b) compressing said lean air/fuel mixture in the head space of said cylinder;
   c) injecting into a body defining an interior cavity disposed adjacent to said cylinder a rich air/fuel mixture at a pressure exceeding the pressure in said head space of said cylinder;
   d) injecting into said head space of said cylinder containing said compressed lean air/fuel mixture said rich air/fuel mixture at a pressure exceeding the pressure in said head space of said cylinder, through an orifice from said cavity to form a jet plume of such rich air/fuel mixture in said cylinder which entrains said compressed lean air/fuel mixture therein;
   e) igniting, in said cavity, portions of the rich air/fuel mixture remaining in said cavity after said high pressure injection; and
   f) injecting the incomplete combustion products resulting from said ignition in said cavity through said orifice into said cylinder to initiate combustion in said cylinder of said jet plume of said rich air/fuel mixture previously formed in said cavity and said compressed lean air/fuel mixture entrained in said jet plume.

9. The process of claim 8 wherein said combustion process further includes providing a high pressure source of said rich air/fuel mixture to said cavity for injection through said orifice into said cylinder.

10. The process of claim 9 wherein said step of providing said high pressure source of said rich air/fuel mixture to said cavity, for injection through said orifice into said cylinder further includes injecting said high pressure source of rich air/fuel mixture as a gas through a high pressure fuel injector into said cavity.

11. The process of claim 10 wherein said step of providing said high pressure source of said rich air/fuel mixture to said cavity for injection through said orifice into said cylinder further includes providing a high pressure gaseous source of rich air/fuel mixture for injection by said high pressure fuel injector into said cavity.

12. The process of claim 8 which includes providing a plurality of said orifices from said cavity to said cylinder disposed in a line lying in a plane normal to the axis of said cylinder to thereby inject a high pressure jet plume of said rich air/fuel mixture into said cylinder in a plane perpendicular to said axis of said cylinder.

13. The process of claim 8 which further includes injecting more than one high pressure jet plume of said rich air/fuel mixture into said cylinder through orifices from a plurality of cavities spaced about the periphery of said cylinder, said orifices disposed in a plane perpendicular to the axis of said cylinder.

14. The process of claim 12 which further includes injecting more than one high pressure jet plume from cavities spaced about the periphery of said cylinder, each of said cavities having multiple orifices leading from said cavity to said cylinder, and all of said orifices disposed in a plane perpendicular to the axis of said cylinder.

15. An improved combustion process for an internal combustion engine which comprises:

a) providing a lean air/fuel mixture to a cylinder of an internal combustion engine;
b) compressing said lean air/fuel mixture in the head space of said cylinder;
c) injecting into said head space of said cylinder containing said compressed lean air/fuel mixture a rich air/fuel mixture at a pressure exceeding the pressure in said head space of said cylinder, through multiple orifices in a plurality of generators, each defining an interior cavity disposed adjacent to said cylinder, to form a plurality of jet plumes of such rich air/fuel mixture in said cylinder which entrain said compressed lean air/fuel mixture therein, said orifices being disposed around said cylinder in a plane parallel to the axis of said cylinder;
d) igniting, in said cavities, portions of the rich air/fuel mixture remaining in said cavities after said high pressure injection; and
e) injecting the incomplete combustion products resulting from said ignition in said cavities through said orifices into said cylinder to initiate combustion in said cylinder of said rich air/fuel mixture previously injected into said cavity and said compressed lean air/fuel mixture entrained in said rich air/fuel mixture.

16. An improved combustion system for an internal combustion engine which comprises:
a) means for providing a lean air/fuel mixture to a cylinder of an internal combustion engine;
b) means for injecting an unignited rich air/fuel mixture at a pressure exceeding the pressure in said cylinder into at least one generator cavity adjacent said cylinder so that said rich air/fuel mixture will flow from said cavity into said cylinder through an orifice in said generator cavity to form a jet plume of such rich air/fuel mixture in said cylinder which entrains said lean air/fuel mixture therein;
c) means for igniting, in said cavity, portions of the rich air/fuel mixture remaining in said cavity after said high pressure injection; and
d) means for injecting the incomplete combustion products resulting from said ignition in said cavity through said orifice into said cylinder to initiate combustion in said cylinder of said rich air/fuel mixture previously injected into said cavity and said lean air/fuel mixture entrained in said rich air/fuel mixture.

17. An improved combustion process for an internal combustion engine which comprises:
a) providing a lean air/fuel mixture to a cylinder of an internal combustion engine;
b) injecting an unignited rich air/fuel mixture into at least one generator cavity adjacent said cylinder at a pressure exceeding the pressure in said cylinder;
c) flowing said unignited rich air/fuel mixture in said generator cavity into the head space of said cylinder through at least one orifice located between said generator cavity and said cylinder to form a jet plume of such rich air/fuel mixture in said cylinder which entrains said lean air/fuel mixture therein;
d) then igniting, in said cavity, portions of the rich air/fuel mixture remaining in said cavity after said high pressure injection; and
e) injecting through said orifice into said cylinder the incomplete combustion products generated in said cavity, triggered by said ignition in said cavity, to initiate combustion in said cylinder of said rich air/fuel mixture previously injected into said cavity and said lean air/fuel mixture entrained in said rich air/fuel mixture.

18. The combustion process of claim 17 wherein said lean air/fuel mixture is compressed in said head space of said cylinder prior to said high pressure injection of said unignited rich air/fuel mixture from said generator cavity into said head space of said cylinder.

19. The combustion process of claim 18 which further includes providing a source of high pressure rich air/fuel mixture to inject said rich air/fuel mixture into said cavity at a pressure exceeding the pressure in said cylinder for injection of said rich air/fuel mixture into said cylinder through said at least one orifice.

20. An improved combustion process for an internal combustion engine which comprises:
a) providing a lean air/fuel mixture to a cylinder of an internal combustion engine;
b) injecting an unignited rich air/fuel mixture into at least one generator cavity adjacent said cylinder at a pressure exceeding the pressure in said cylinder;
c) injecting said unignited rich air/fuel mixture in said generator cavity into the head space of said cylinder through at least one orifice located between said generator cavity and said cylinder to form a jet plume of such rich air/fuel mixture in said cylinder which entrains said lean air/fuel mixture therein;
d) then igniting, in said cavity, portions of the rich air/fuel mixture remaining in said cavity after said high pressure injection by providing a spark between electrodes in said generator cavity; and
e) injecting through said orifice into said cylinder the incomplete combustion products generated in said cavity, triggered by said ignition in said cavity, to initiate combustion in said cylinder of said rich air/fuel mixture previously injected into said cavity and said lean air/fuel mixture entrained in said rich air/fuel mixture.

* * * * *